(12) United States Patent  
Ooba

(10) Patent No.: US 8,718,078 B2
(45) Date of Patent: May 6, 2014

(54) MULTI-HOMED COMMUNICATION APPARATUS, AND CONTROL METHOD AND STORAGE MEDIUM THEREFOR

(75) Inventor: Hideaki Ooba, Sagamihara (JP)

(73) Assignee: Canon Kabushiki Kaisha (JP)

( * ) Notice: Subject to any disclaimer, the term of this patent is extended or adjusted under 35 U.S.C. 154(b) by 274 days.

(21) Appl. No.: 12/952,542

(22) Filed: Nov. 23, 2010

(65) Prior Publication Data

US 2011/0131310 A1    Jun. 2, 2011

(30) Foreign Application Priority Data

Nov. 30, 2009   (JP) ................................. 2009-271907

(51) Int. Cl.
*H04W 84/08*    (2009.01)
(52) U.S. Cl.
USPC ............................ 370/419; 370/392; 370/400
(58) Field of Classification Search
USPC .............................................. 709/223; 726/4
See application file for complete search history.

(56) References Cited

U.S. PATENT DOCUMENTS

| 2002/0154328 | A1 | 10/2002 | Sato | |
|---|---|---|---|---|
| 2007/0177600 | A1* | 8/2007 | Suzuki et al. | 370/392 |
| 2009/0132698 | A1* | 5/2009 | Barnhill, Jr. | 709/224 |
| 2010/0186068 | A1* | 7/2010 | Okuyama | 726/4 |

FOREIGN PATENT DOCUMENTS

| JP | 10-093803 | A | | 4/1998 | |
|---|---|---|---|---|---|
| JP | 10093803 | | * | 4/1998 | ............... H04N 1/32 |
| JP | 2002-312140 | A | | 10/2002 | |
| JP | 2003-051857 | A | | 2/2003 | |
| JP | 2004-080331 | A | | 3/2004 | |
| JP | 2008-263437 | A | | 10/2008 | |

OTHER PUBLICATIONS

Japanese Office Action cited in Japanese counterpart application No. JP2009-271907, dated Nov. 12, 2013.

* cited by examiner

*Primary Examiner* — Anh-Vu Ly
*Assistant Examiner* — Hashim Bhatti
(74) *Attorney, Agent, or Firm* — Rossi, Kimms & McDowell LLP

(57) ABSTRACT

A communication apparatus able to maintain and improve the security at the time of retransmission of stored data to a network even in a network environment where multi-home connection can be made. When receiving a job through a network, the communication apparatus identifies the network through which the job is received, adds network information representing the identified network to the job, and stores the network information into a management table when the job is stored into an image forming apparatus. When acquisition of any of data stored in the image forming apparatus is requested by a terminal apparatus, whether a transmission condition is satisfied is determined based the network information for the requested data and transmission destination network information in the management table, and the requested data is transmitted, if the transmission condition is satisfied.

13 Claims, 21 Drawing Sheets

FIG.7

| ID | FILE NAME | SIZE | Network |
|---|---|---|---|
| 1 | Test | 1243567 | A |
| 2 | temp | 200543455 | B |

FIG.11A

| NETWORK INFORMATION (1101) | TRANSMISSION DESTINATION NETWORK INFORMATION (1102) | POLICY (1103) | |
|---|---|---|---|
| A | A | OK | ← 1104 |
| A | B | NG | ← 1105 |
| B | A | NG | ← 1106 |
| B | B | OK | ← 1107 |

FIG.11B

| NETWORK INFORMATION (1101) | TRANSMISSION DESTINATION NETWORK INFORMATION (1102) | POLICY (1103) | |
|---|---|---|---|
| A | A | OK | ← 1201 |
| A | B | OK | ← 1202 |
| B | A | NG | ← 1203 |
| B | B | OK | ← 1204 |

FIG.14

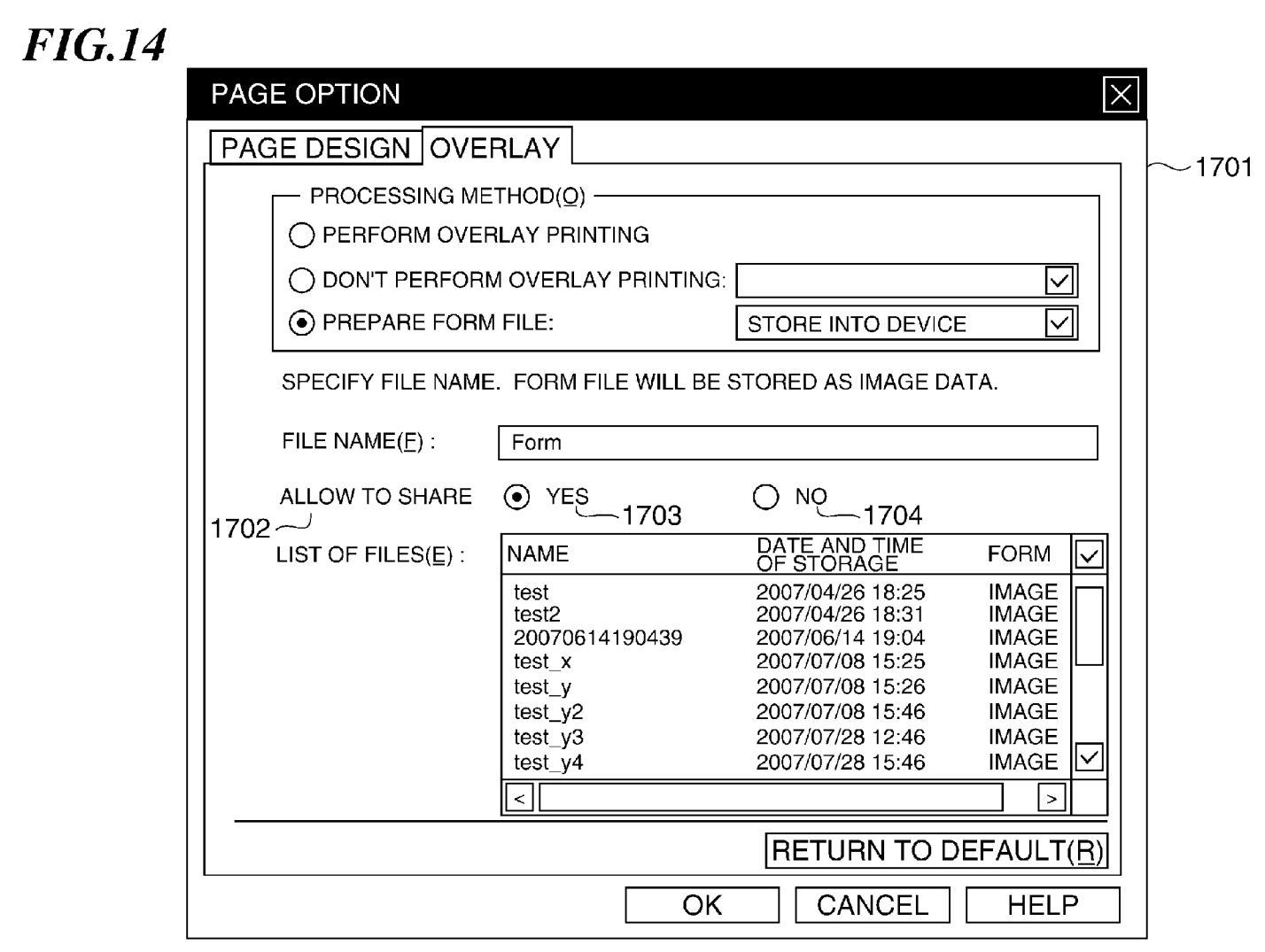

PAGE OPTION

PAGE DESIGN | OVERLAY

PROCESSING METHOD(O)
○ PERFORM OVERLAY PRINTING
○ DON'T PERFORM OVERLAY PRINTING:
● PREPARE FORM FILE: STORE INTO DEVICE

SPECIFY FILE NAME. FORM FILE WILL BE STORED AS IMAGE DATA.

FILE NAME(F): Form

ALLOW TO SHARE ● YES — 1703  ○ NO — 1704

LIST OF FILES(E):

| NAME | DATE AND TIME OF STORAGE | FORM |
|---|---|---|
| test | 2007/04/26 18:25 | IMAGE |
| test2 | 2007/04/26 18:31 | IMAGE |
| 20070614190439 | 2007/06/14 19:04 | IMAGE |
| test_x | 2007/07/08 15:25 | IMAGE |
| test_y | 2007/07/08 15:26 | IMAGE |
| test_y2 | 2007/07/08 15:46 | IMAGE |
| test_y3 | 2007/07/28 12:46 | IMAGE |
| test_y4 | 2007/07/28 15:46 | IMAGE |

OK  CANCEL  RETURN TO DEFAULT(R)  HELP 1701
1702

FIG.15

%!PS-ZZZ-1.0
%%Title: Form.eps
%%Creator: BBBBBB
　·
　·
　·
%%N-Up: 1
%%Duplex: Off
%%Network(Share) ～ 1501
　·
　·
　·

FIG.17

Duplex = OFF  
Size= A4  
⋮  
Orientation = Portrait  }~ 1901

Network = Share ~ 1902

FIG.21A

| NETWORK INFORMATION | TRANSMISSION DESTINATION NETWORK INFORMATION | POLICY | |
|---|---|---|---|
| A | A | OK | 2204 |
| A | B | NG | 2205 |
| B | A | NG | 2206 |
| B | B | OK | 2207 |
| Share | A | OK | 2208 |
| Share | B | OK | 2209 |
| Secure | A | NG | 2210 |
| Secure | B | NG | 2211 |

FIG.21B

| NETWORK INFORMATION | TRANSMISSION DESTINATION NETWORK INFORMATION | POLICY | |
|---|---|---|---|
| A | A | OK | 2301 |
| A | B | OK | 2302 |
| B | A | NG | 2303 |
| B | B | OK | 2304 |
| Share | A | OK | 2305 |
| Share | B | OK | 2306 |
| Secure | A | NG | 2307 |
| Secure | B | NG | 2308 |

MULTI-HOMED COMMUNICATION APPARATUS, AND CONTROL METHOD AND STORAGE MEDIUM THEREFOR

BACKGROUND OF THE INVENTION

1. Field of the Invention

The present invention relates to a communication apparatus and a control method and a storage medium therefor, and more particularly, to a technique for improving the security of data transfer between a multi-homed communication apparatus and networks.

2. Description of the Related Art

Some of printers in a printing system on a network environment have a function of printing a job transmitted from a PC (personal computer) via a network, storing the job, and transmitting the stored job to a desired PC on the network.

Since such printers of the printing system are sharedly used by users, users' usage of printers is sometimes managed to maintain and improve the security of the printing system. With the management of users' printer usage, users able to use printers are limited and usable processes are determined according to each individual user, whereby the security of the printing system is improved (see, for example, Japanese Laid-open Patent Publication No. 10-93803).

Another system having a plurality of network interfaces (I/Fs) and configured to change processing according to which I/F is used for data reception has been proposed. When receiving a network packet from a terminal apparatus such as a PC, the proposed system identifies the terminal apparatus based on network packet transmission source information, and implements a function requested by the identified terminal apparatus in accordance with a predetermined rule for the identified apparatus. In a case for example that a color printing request is received, color printing is performed, if the request is received from any of designated IP addresses, whereas color printing is not performed, if the request is received from an IP address other than the designated IP addresses (see, for example, Japanese Laid-open Patent Publication No. 2004-080331).

In recent years, a so-called multi-homed terminal apparatus has been provided that has a plurality of network I/Fs and is configured capable of being simultaneously connected with different networks. Such a construction is advantageous in, for example, that even if communication with one of the networks cannot be established, communication can be achieved via another network, and that each individual terminal apparatus can be connected to a plurality of independent networks.

Also for a printing system, there is a demand of having multi-home connectivity, and a multi-horned printing system including image forming apparatuses or including image forming apparatuses and a print control apparatus is known. The print control apparatus is utilized to add image forming apparatuses with a network printer function or expand the existing network printer function of image forming apparatuses. An image forming apparatus that can be network-connected via a print control apparatus of this type is proposed in, e.g., Japanese Laid-open Patent Publication No. 2002-312140.

However, in some cases, a multi-homed printing system entails inconveniences arising from security measures for stored jobs. For example, a problem is posed that data cannot be exchanged between independent networks, if security levels are provided for data transmission/reception.

In a multi-homed printing system configured for a network environment where there is a superordinate/subordinate concept that data can be transmitted from a superordinate network to a subordinate network, but cannot be transmitted from the subordinate network to the superordinate network, there is a possibility that a stored job is erroneously transmitted to a network to which the stored job should not be transmitted.

With the user management disclosed in Japanese Laid-open Patent Publication No. 10-93803, when data stored into the printing system without any user management problem is reused, no restriction is applied, so that the stored data becomes reusable in contradiction to a network operation policy.

With the processing performed on a per terminal apparatus basis as disclosed in Japanese Laid-open Patent Publication No. 2004-080331, no restriction is applied to stored data, so that the stored data becomes reusable in contradiction to a network operation policy.

SUMMARY OF THE INVENTION

The present invention provides a communication apparatus capable of maintaining and improving the security at the time of retransmission of stored data to a network even in a network environment where multi-home connection can be made, and provides a control method and a storage medium for the communication apparatus.

According to a first aspect of this invention, there is provided a communication apparatus connected to a plurality of networks for communication with terminal apparatuses on the plurality of networks, which comprises a reception unit configured to receive data transmitted from any of the terminal apparatuses, a network identification unit configured to identify the network through which the data is received, a network information addition unit configured to add, to the received data, network identification information representing the identified network, a storage unit configured to store the received data and the network identification information such that they correspond to each other, and a data transmission propriety judgment unit configured, when any of data stored in the storage unit is attempted to be transmitted to any of the terminal apparatuses, to determine propriety of data transmission based on the network identification information added to the data attempted to be transmitted.

According to a second aspect of this invention, there is provided a communication apparatus connected to a plurality of networks for communication with terminal apparatuses on the plurality of networks, which comprises a reception unit configured to receive data transmitted from any of the terminal apparatuses, a network information judgment unit configured to determine whether network information is embedded in the received data, a network information addition unit configured, in a case where network information is included in the received data, to add the embedded network information to the received data, a storage unit configured to store the received data and the network identification information such that they correspond to each other, and a data transmission propriety judgment unit configured, when any of data stored in the storage unit is attempted to be transmitted to any of the terminal apparatuses, to determine propriety of data transmission based on the network identification information added to the data attempted to be transmitted.

According to a third aspect of this invention, there is provided a control method for the communication apparatus described in the first aspect.

According to a fourth aspect of this invention, there is provided a control method for the communication apparatus described in the second aspect.

According to a fifth aspect of this invention, there is provided a storage medium storing a program for executing the control method described in the third aspect.

According to a sixth aspect of this invention, there is provided a storage medium storing a program for executing the control method described in the fourth aspect.

With this invention, the security at the time of retransmission of stored data to a network can be maintained and improved even in a network environment where multi-home connection can be made.

Further features of the present invention will become apparent from the following description of exemplary embodiments with reference to the attached drawings.

BRIEF DESCRIPTION OF THE DRAWINGS

FIG. 7 is a view showing an example of a management table stored in an HDD of the image forming apparatus;

FIG. 11A is a view showing an example of a transmission policy table utilized in the process in FIG. 10 to transmit received data the same network as that from which the data has been received;

FIG. 11B is a view showing an example of a transmission policy table utilized in the process in FIG. 10 in a case where there is a superordinate/subordinate concept between networks;

FIG. 14 is a view showing an example of a UI screen that accepts a user's shared setting on a job to be transmitted from the terminal apparatus;

FIG. 15 is a view showing an example of attribute information of a job transmitted from the terminal apparatus to the print control apparatus;

FIG. 17 is a view showing an example of attribute information of a job to which network information is added;

FIG. 21A is a view showing an example of a transmission policy table utilized to transmit received data to the same network; and FIG. 21B is a view showing an example of a transmission policy table utilized in a case where there is a superordinate/subordinate concept between networks.

DESCRIPTION OF THE EMBODIMENTS

The present invention will now be described in detail below with reference to the drawings showing preferred embodiments thereof.

(First Embodiment)

Figure 1:
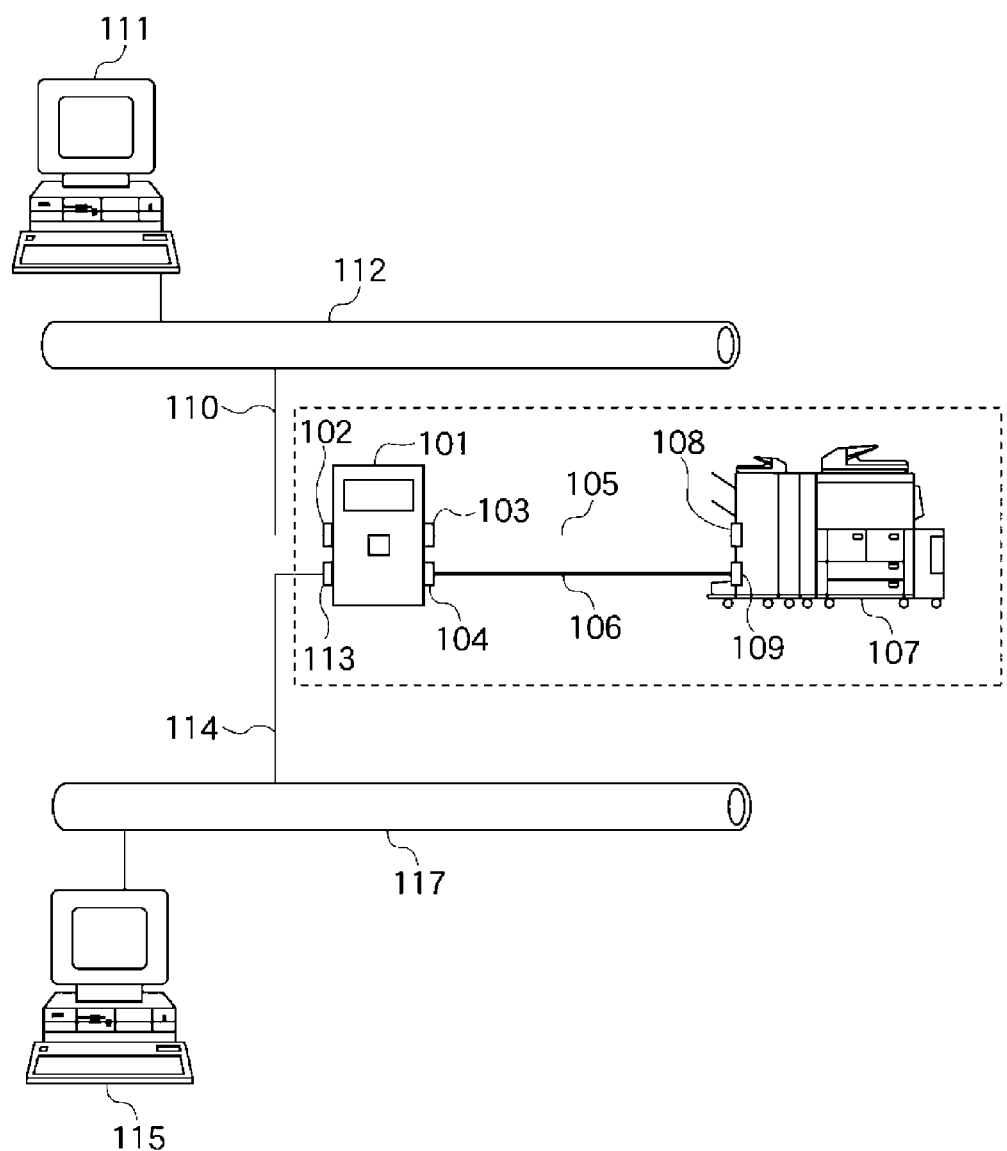
FIG. 1 is a view showing an example construction of a printing system including a print control apparatus which is a communication apparatus according to a first embodiment of this invention.

FIG. 1 shows the construction of a printing system that includes a communication apparatus according to a first embodiment of this invention.

A print control apparatus 101 (communication apparatus) includes a plurality of network interface cards (NICs) 102, 103, and 113 and a dedicated line interface (I/F) board 104. The first NIC 102 is connected via a signal line 110 to a network 112 such as a LAN, and the second NIC 113 is connected via a signal line 114 to a network 117 such as a LAN.

An image forming apparatus 107 includes a network I/F 108 such as Ethernet (registered trademark), which is connected via a signal line 105 to the third NIC 103 of the print control apparatus 101, and a dedicated line I/F board 109 connected via a dedicated line 106 to the dedicated line I/F board 104 of the print control apparatus 101.

The network I/F 108 is not limited to the Ethernet (registered trademark), and may be a parallel I/F, a USB_I/F, or the like. In that case, the print control apparatus 101 is connected to the image forming apparatus 107 via, e.g., one or more interface cables.

A terminal apparatus 111 such as a personal computer (PC) is connected to the network 112. Data transmitted from the terminal apparatus 111 is input to the print control apparatus 101 via the network 112, the signal line 110, and the first NIC 102.

A terminal apparatus 115 such as a PC is connected to the network 117. Data transmitted from the terminal apparatus 115 is input to the print control apparatus 101 via the network 117, the signal line 114, and the second NIC 113.

Figure 2:
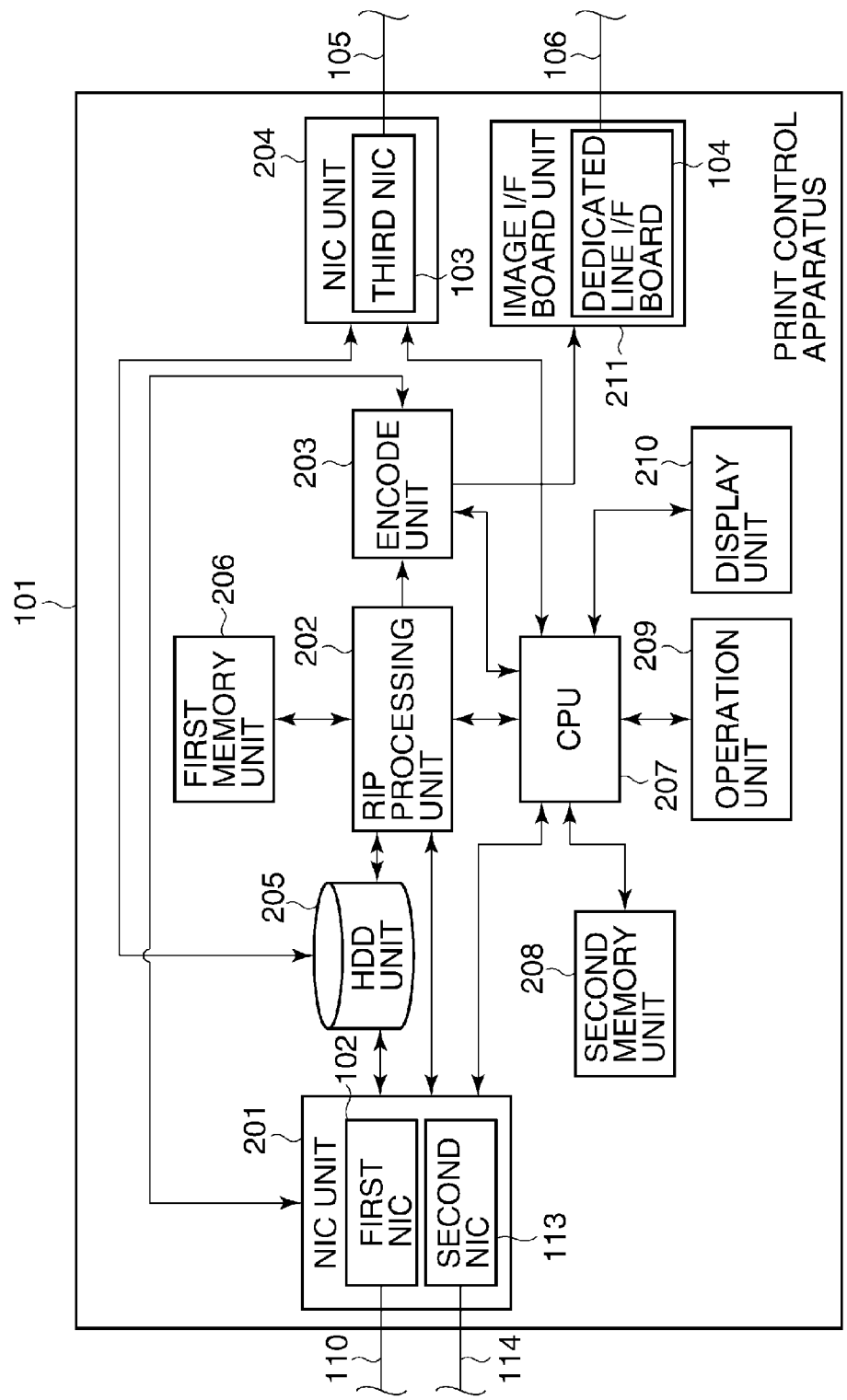
FIG. 2 is a block diagram schematically showing the hardware construction of the print control apparatus.

FIG. 2 schematically shows in block diagram the hardware construction of the print control apparatus 101.

The print control apparatus 101 includes NIC units 201, 204, RIP processing unit 202, encode unit 203, HDD unit 205, first memory unit 206, CPU 207, second memory unit 208, operation unit 209, display unit 210, and image I/F board unit 211.

The NIC unit 201 includes the first and second NICs 102, 113, and functions as a first network I/F that establishes lower layer level connection with the network. The RIP processing unit 202 and the HDD unit 205 are connected to an output side of the NIC unit 201. The RIP processing unit 202 has a function for converting job data (print data) received by the NIC unit 201 into a raster image.

The HDD unit 205 temporarily stores (spools) job data received by the NIC unit 201 and temporarily stores data processed by the RIP processing unit 202. The HDD unit 205, first memory unit 206, encode unit 203, and CPU 207 are connected to the RIP processing unit 202 that uses the first memory unit 206 to perform a process for image development. Data converted into a raster image by the RIP processing unit 202 is input to the encode unit 203 that converts the data into a data format or into job data of a form supported by the image forming apparatus 107.

The CPU 207 is connected to the NIC unit 201, RIP processing unit 202, encode unit 203, NIC unit 204, second memory unit 208, operation unit 209, and display unit 210, and controls the entire print control apparatus 101.

Data output from the encode unit 203 is transferred to the image I/F board unit 211 and then transmitted to the image forming apparatus 107 via the dedicated line 106. The NIC unit 204 includes the third NIC 103 and functions as a second network I/F that establishes lower layer level connection with the network. The second memory unit 208 is utilized by the CPU 207 as a storage area for temporarily storing data during the execution of control. The operation unit 209 includes buttons, keys, etc., and accepts a user's instruction/request to the print control apparatus 101. The display unit 210 is comprised of a liquid crystal panel, etc., and displays an image or characters on a screen for notification of information to the user. The display unit 210 and the operation unit 209 may be configured integrally, e.g., in the form of a touch panel.

Referring to FIG. 1 again, a data packet transmitted from the terminal apparatus 111 to the print control apparatus 101 is input to the apparatus 101 via the network 112 and the first NIC 102. A data packet transmitted from the terminal apparatus 115 to the print control apparatus 101 is input to the apparatus 101 via the network 117 and the second NIC 113.

In the print control apparatus 101, the NIC unit 201 receives a data packet. In a case that the data packet received by the NIC unit 201 is compatible with TCP/IP, a destination port number is included in a header part of the packet. The destination port number indicates to which one of programs/processes executable by a packet reception apparatus the data is to be transmitted. Different port numbers are assigned to different communication protocols and different programs, for example, as shown below.

FTP (file transfer protocol)=Port 21
SMTP (simple mail transfer protocol)=Port 25
SNMP (simple network management protocol)=Port 161

It is therefore possible to determine whether a received data packet is job data or other data such as control data by finding a port number contained in the header part of the received data packet and by determining whether the found port number corresponds to a print process.

If it is determined that the received data packet is job data, the received job data is written into the HDD unit 205, as needed, under the control of the CPU 207. Such data writing is known as queuing (spooling), which is generally performed to improve, e.g., data transfer speed. The data stored in the HDD unit 205 is read by the RIP processing unit 202 according to an instruction from the CPU 207. On the other hand, if the received job data is not queued, the job data is transferred from the NIC unit 201 directly to the RIP processing unit 202 according to an instruction from the CPU 207.

The job data thus sent to the RIP processing unit 202 is converted by the RIP processing unit 202 into a raster image, which is then encoded based on a format of the job data by the encode unit 203 into predetermined data format that can be interpreted by the image forming apparatus 107. Instead of encoding to the predetermined data format, the raster image can be encoded to, e.g., a data format acquired by communication from the image forming apparatus 107 or to a data format designated via the operation unit 209.

It should be noted that if the format of received job data can be interpreted by the image forming apparatus 107, encoding can be skipped.

The encoded data format varies according to the ability of interpretation means built in the image forming apparatus 107, and is, e.g., a particular print language format, or a data/document format compressed by a particular method such as JBIG.

The data encoded as needed is again converted by the NIC unit 204 into a data packet, which is then delivered to the image forming apparatus 107 via the signal line 105. Upon receipt of the data packet, the image forming apparatus 107 performs printing on a recording sheet according to predetermined printing procedures. It should be noted that, in order to transfer data from the print control apparatus 101 to the image forming apparatus 107, it is possible to deliver the data from the encode unit 203 via the image I/F board unit 211 and the dedicated line I/F board 104 to the dedicated line 106. The data delivered to the dedicated line 106 is received by the image forming apparatus 107 via the dedicated line I/F board 109.

Figure 3:
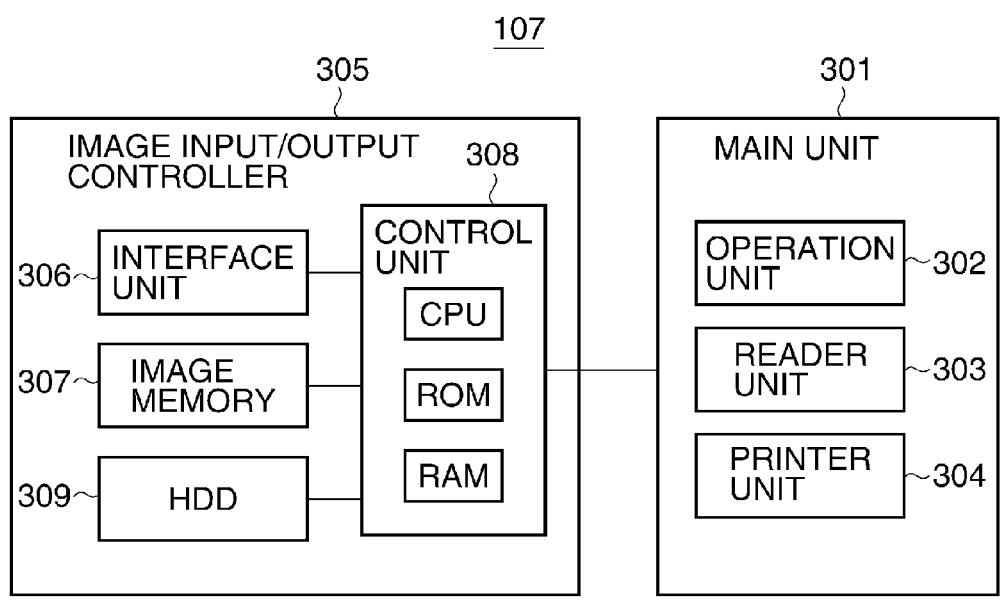
FIG. 3 is a block diagram schematically showing the hardware construction of an image forming apparatus shown in FIG. 1.

FIG. 3 schematically shows in block diagram the hardware construction of the image forming apparatus 107.

The image forming apparatus 107 includes an image forming apparatus main unit 301 and an image input/output controller 305 connected to the main unit 301. The main unit 301 includes an operation unit 302, a reader unit 303, and a printer unit 304. The operation unit 302 is a user interface (UI) for operating the main unit 301 and the controller 305, and is integrally attached with an operation display panel, for instance. The reader unit 303 reads an image of an original, and outputs original image data to the printer unit 304 and to the image input/output controller 305. Based on image data supplied from the reader unit 303 or from the controller 305, the printer unit 304 records an image on a recording sheet.

The image input/output controller 305 includes an interface unit 306, an image memory 307, a control unit 308, and a hard disk drive (HDD) 309. The HDD 309 stores, e.g., an address book, an operation history, setting information such as user setting, ID setting, and network setting, and a management table shown in FIG. 7, which will be described later.

The interface unit 306 provides an interface with the print control apparatus 101. The interface unit 306 receives, at the dedicated line I/F board 109, code data that represents an image transferred from the print control apparatus 101, develops the received data into image data that can be recorded by the printer unit 304, and delivers the developed image data to the control unit 308.

The interface unit 306 receives at the NIC 108 code data that represents image data transmitted from the print control apparatus 101, develops, as needed, the received data into data that can be recorded by the printer unit 304, and delivers the received data or the developed data to the control unit 308.

The control unit 308 includes a CPU, ROM, RAM, and the like. The CPU of the control unit 308 loads, onto the RAM, a program stored in the ROM or other storage medium, and executes the loaded program, thereby controlling data flow mainly between the reader unit 303, interface unit 306, and image memory 307. It should be noted that a nonvolatile memory can be provided in addition to or instead of the HDD 309, and data can be stored in the nonvolatile memory.

Next, a description will be given of a case where when the printing system retransmits job data (job) received from, e.g., the terminal apparatus 111 via the network, a restriction is applied to data transfer by adding network information to the job data. The following process is executed by the CPU 207 of the print control apparatus 101 and the control unit 308 of the image forming apparatus 107 (hereinafter, simply referred to as the print control apparatus 101 and the image forming apparatus 107). A process for transmitting and receiving a job or the like is executed by the print control apparatus 101 and the image forming apparatus 107 in cooperation with the structural elements previously described with reference to FIGS. 2 and 3.

First, with reference to FIGS. 4 to 7, a description will be given of a series of operation processes where the print control apparatus 101 receives a job generated by the terminal apparatus 111 and transfers the received job to the image forming apparatus 107, and the image forming apparatus 107 stores the received job into the HDD 309. The following description is also applicable to a case where a job is generated by the terminal apparatus 115 and a description of such a case will be omitted.

Figure 4:
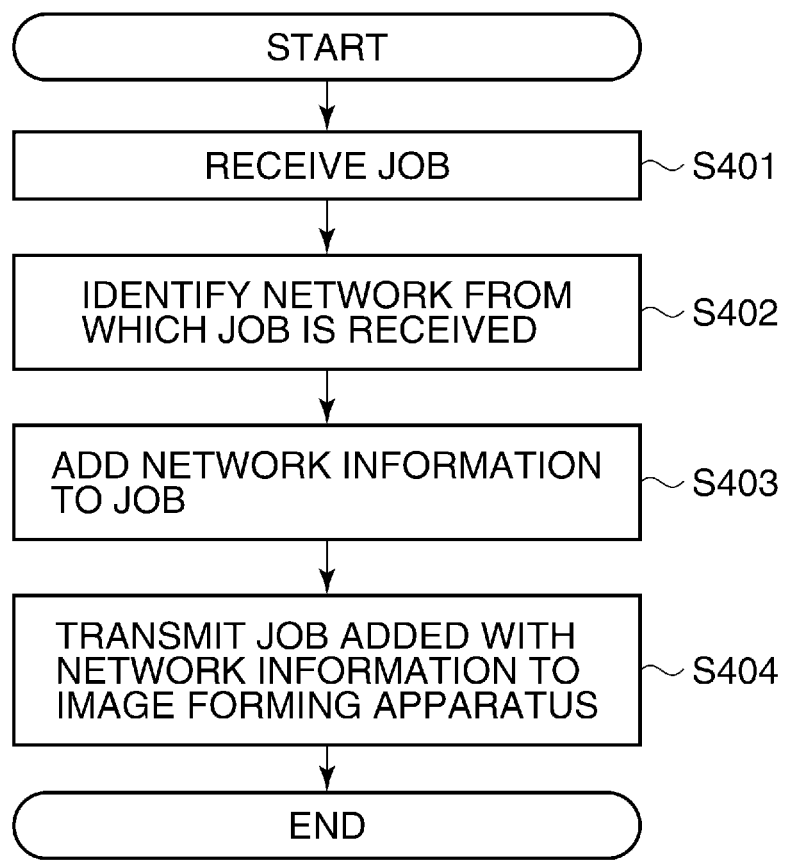
FIG. 4 is a flowchart showing an example process performed by the print control apparatus that receives a job from a terminal apparatus.

FIG. 4 shows in flowchart an example process performed by the print control apparatus 101 that receives a job from the terminal apparatus 111.

When operated by a user to generate a job to be stored into the image forming apparatus 107, the terminal apparatus 111 transmits the job to the print control apparatus 101 according to user's operations.

Specifically, the print control apparatus 101 receives, via a network (the network 112 in this example), the job transmitted from the terminal apparatus 111 (step S401), and identifies the network from which the job is received (Step S402). Step S402 is an example of a network identification unit. In Step S402, the print control apparatus 101 acquires network information from a socket prepared by the apparatus 101 for reception of the job. Alternatively, it is possible to acquire the network information based on a result of determination of whether currently received data is transmitted from the network 112 or from the network 117. The determination can be performed by using a driver for monitoring data reception by the NICs.

In step S403, the print control apparatus 101 adds the network information acquired in step S402 to job attribute information. Step S403 is an example of a network information addition unit. In Step S404, the print control apparatus 101 transmits the job added with the network information to the image forming apparatus 107. It should be noted that it is possible to transmit the job to the image forming apparatus 107 after required processing (e.g., RIP processing) is performed on the job by the print control apparatus 101.

Figure 5:
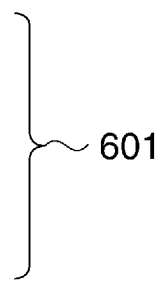
FIG. 5 is a view showing an example job attribute information to which network information is added.

FIG. 5 shows an example of job attribute information added with network information.

In FIG. 5, reference numeral 601 denotes job attribute information (sheet size, surface designation, etc.) received by the print control apparatus 101 from the terminal apparatus 111.

Reference numeral 602 denotes network information acquired in Step S402 by the print control apparatus 101 and added to the job. In the illustrated example, the network identification information 602 (Network=A) added to the job attribute information 601 includes an attribute value A that represents the network 112.

Figure 6:
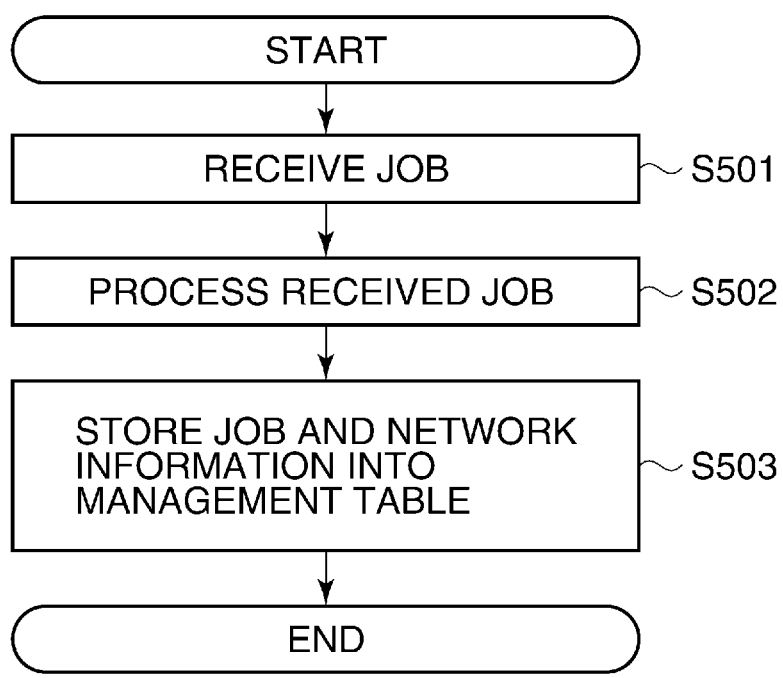
FIG. 6 is a flowchart showing an example process performed by the image forming apparatus that receives a job from the print control apparatus.

FIG. 6 shows in flowchart an example process performed by the image forming apparatus 107 that receives a job from the print control apparatus 101.

Referring to FIG. 6, the image forming apparatus 107 receives a job from the print control apparatus 101 (step S501), and processes (e.g., prints) the received job (step S502).

In Step S503, the image forming apparatus 107 acquires, from the received job, network information added by the print control apparatus 101, and stores the job and the network information into a management table 700 (FIG. 7) in the HDD 309.

Referring to FIG. 7, the management table 700 includes an ID storage field 701, file name storage field 702, file size storage field 703, and network information storage field 704. The network information storage field 704 stores pieces of network information each acquired from a corresponding job. In the illustrated example, an attribute value A representing the network 112 and an attribute value B representing the network 117 are stored as network information in the storage field 704.

In this embodiment, network information is always added to each job. However, network information can be added according to user setting. In that case, a UI for enabling the user to set whether network information should be added to a job is provided on the operation unit 209 of the print control apparatus 101 or on the operation unit 302 of the image forming apparatus 107. An example of a UI screen for accepting a user setting is shown in FIG. 8.

Figure 8:
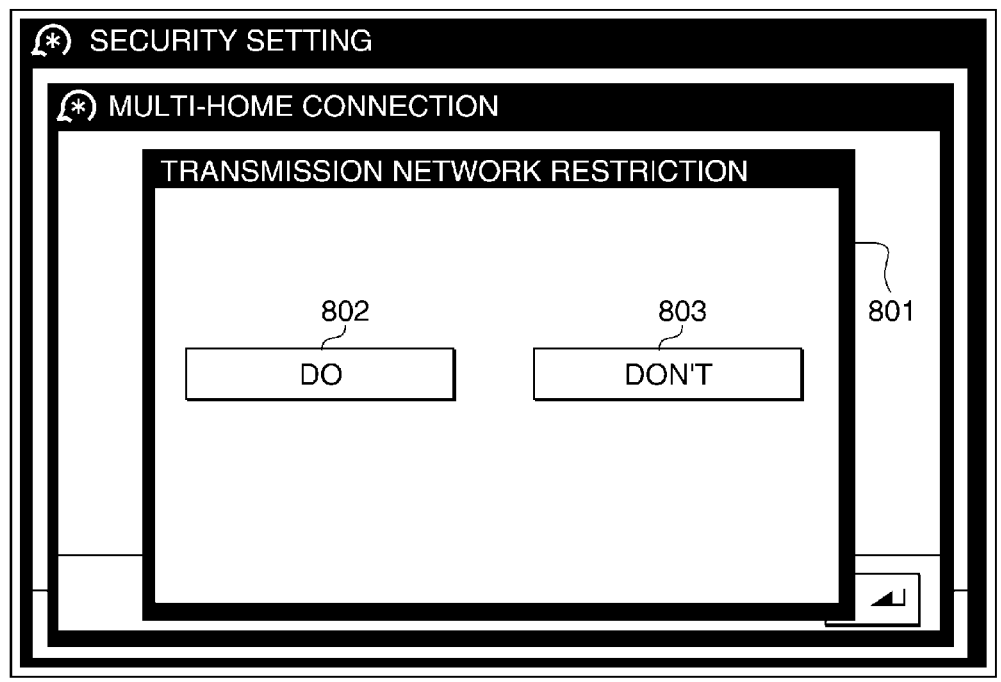
FIG. 8 is a view showing an example of a transmission network restriction setting screen displayed on an operation unit of the image forming apparatus.

In FIG. 8, reference numeral 801 denotes a UI screen for setting whether network information is to be added, i.e., whether data transfer is to be restricted as described later. A "Do" button 802 and an "Don't" button 803 are disposed on the screen 801. When the "Do" button 802 is depressed by a user, network information is added to the job. On the other hand, when the "Don't" button 803 is depressed, network information is not added to the job. The setting information can be stored in either one or both of the print control apparatus 101 and the image forming apparatus 107.

Next, with reference to FIGS. 9 and 10, a description will be given of an operation process performed by the image forming apparatus 107 to transmit data (job) stored in the HDD 309 to the terminal apparatus 111. The following description is also applicable to a case where data is transmitted to the terminal apparatus 115 and a description of such a case will be omitted.

Figure 9:
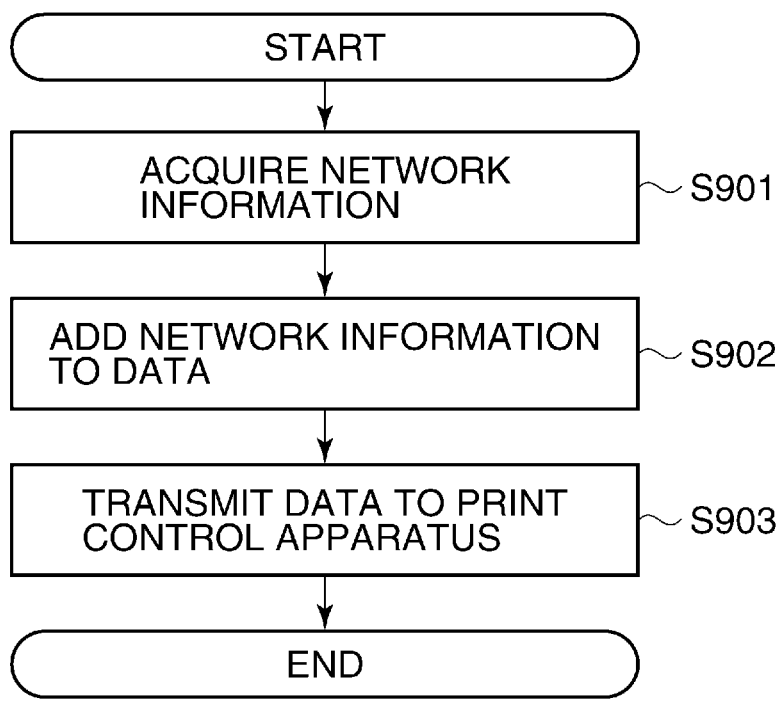
FIG. 9 is a flowchart showing an example process performed by the image forming apparatus to transmit data to the print control apparatus.

FIG. 9 shows in flowchart an example of a process performed by the image forming apparatus 107 to transmit data to the print control apparatus 101.

The process shown in FIG. 9 is started when a user operates the operation unit 302 of the image forming apparatus 107 to transmit data stored in the HDD 309 to the terminal apparatus 111.

In Step S901, the image forming apparatus 107 refers to the management table 700 stored in the HOD 309, and acquires data designated by the user operation and network information (attribute value) associated with the designated data.

In Step S902, the image forming apparatus 107 adds the network information acquired in step S901 to the data. Although not limitative, to add the network information to the data, the network information can be embedded in the data, or added to attribute information of the data, or added to a reserve are of a network packet header part.

It should be noted that if network information cannot be acquired in Step S901, no network information may be added to the data. In a case that a setting to restrict data transfer has been made on the screen 801 in FIG. 8, the image forming apparatus 107 may cancel data transmission and may provide display on the screen to notify the user to that effect. Next, the flow proceeds to step S903 where the data is transmitted as a job to the print control apparatus 101.

In Step S903, it is possible, before the data transmission, to transmit only the network information to the print control apparatus 101 that determines whether the data transmission can be made. If it is determined that the data transmission can be made, the data is transmitted. If it is determined that the data transmission cannot be made, the data is not transmitted.

Figure 10:
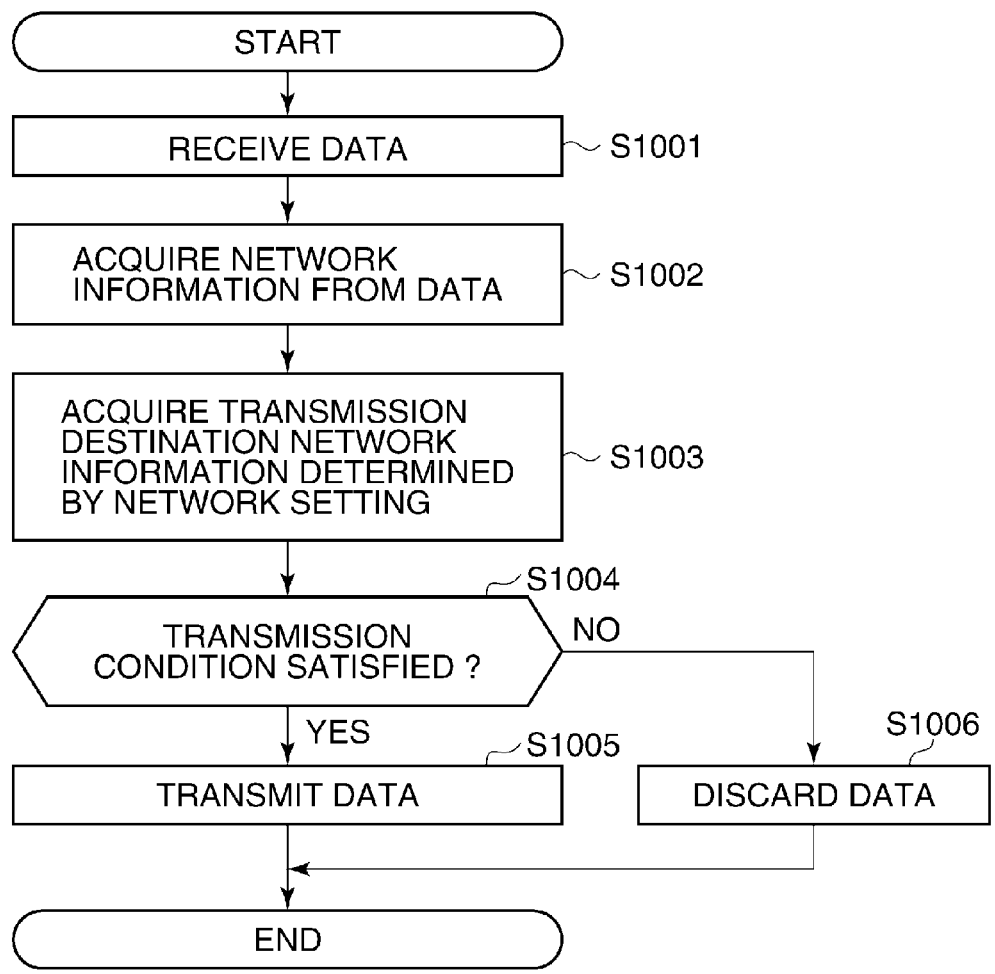
FIG. 10 is a flowchart showing an example process performed by the print control apparatus that receives data from the image forming apparatus.

FIG. 10 shows in flowchart an example process performed by the print control apparatus 101 that receives data from the image forming apparatus 107.

The print control apparatus 101 receives data from the image forming apparatus 107 (step S1001), and acquires network information from the received data (step S1002).

In Step S1003, the print control apparatus 101 acquires predetermined transmission destination network information. Step S1003 is an example of a transmission destination network information acquisition unit. The transmission destination network information is uniquely determined by a network setting (address setting, default gateway setting, routing setting, etc.) in the print control apparatus 101.

In Step S1004, the print control apparatus 101 determines whether a transmission condition (transmission policy) is satisfied based on the network information acquired in Step S1002 and the transmission destination network information acquired in Step S1003. Step S1004 is an example of a data transmission propriety judgment unit. It is determined in Step S1004 that the transmission policy is satisfied, the flow proceeds to Step S1005 in which the data is transmitted to the network 112 (or to the network 117), whereby the terminal apparatus 111 (or the terminal apparatus 115) is able to receive the data transmitted from the image forming apparatus 107. On the other hand, if the transmission policy is not satisfied, the flow proceeds to Step S1006 where the data is discarded and the present process is completed. In Step S1006, it is possible not to discard the data but to stop the data transmission. When the data transmission is stopped or the data is discarded, an event can be generated to notify the image forming apparatus 107 to that effect.

FIG. 11A shows an example of a transmission policy table utilized in Step S1004 of FIG. 10 to transmit received data to the same network as that from which the data has been received, and FIG. 11B shows an example of a transmission policy table utilized in Step S1004 10 in a case that there is a superordinate/subordinate concept between networks.

The transmission policy table shown in FIG. 11A is utilized, for example, when the image forming apparatus 107 stores a job received from the terminal apparatus 111 on the network 112 and transmits the job not to the network 117 but to the network 112. With this transmission policy, the job can be transmitted only to a network of the same level as a transmission source network from which the job has been received, and cannot be transmitted to other networks.

As shown in FIG. 11A, the transmission policy table includes a network information field 1101, a transmission destination network information field 1102, and a policy field 1103. Reference numerals 1104 to 1107 in FIG. 11A denote the first to fourth lines of the transmission policy table, respectively. In the fields 1101 to 1103 of each line, there are stored information that represents a data reception source network (an attribute value A or B representing a network A or B in the illustrated example), information that represents a data transmission destination candidate network (the attribute value A or B in the illustrated example), and information that represents whether data can be transmitted to the candidate network (a value of OK or NG in the illustrated example), respectively.

Values A, A, and OK indicating that data received via the network A can be transmitted (transferred) to the same network A are stored in the fields 1101 to 1103 of the first line 1104.

Values A, B, and NG indicating that data received via the network A cannot be transmitted (transferred) to the different network B are stored in the fields 1101 to 1103 of the second line 1105. The third line 1106 indicates that data received via the network B cannot be transmitted (transferred) to the network A. The fourth line 1107 indicates that data received via the network B can be transmitted (transferred) to the network B.

The transmission policy table shown in FIG. 11B is applied in a case where there is a superordinate/subordinate concept between networks. This transmission policy indicates that data can be transmitted from a superordinate network (the network A in the illustrated example) to a subordinate network (the network B in the illustrated example), but cannot be transmitted from the subordinate network to the superordinate network.

As shown in FIG. 11B, the transmission policy table includes a network information filed 1101, a transmission destination network information field 1102, and a policy field 1103. Reference numerals 1201 to 1204 in FIG. 11B denote the first to fourth lines of the transmission policy table, respectively. In the fields 1101 to 1103 of each line, there are stored information that represents a received data transmission source network (the attribute value A or B representing the network A or B in the illustrated example), information that represents a data transmission destination candidate network (the attribute value A or B in the illustrated example), and information that represents whether data can be transmitted to the candidate network (a value of OK or NG in the illustrated example), respectively.

Values A, A, and OK stored in the fields 1101 to 1103 of the first line 1201 indicate that data received via the network A can be transmitted (transferred) to the network A of the same level.

Values A, B, and OK stored in the fields 1101 to 1103 of the second line 1202 indicate that data received via the superordinate network A can be transmitted (transferred) to the subordinate network B.

Values B, A, and NG stored in the fields 1101 to 1103 of the third line 1203 indicate that data received via the subordinate network B cannot be transmitted (transferred) to the superordinate network A. The fourth line 1204 indicates that data received via the network B can be transmitted (transferred) to the network B of the same level.

Although transmission conditions (transmission policies) associated with the two networks A, B have been described in this embodiment, the transmission conditions are not limitative thereto and other policies can be defined.

In this embodiment, whether the transmission condition is satisfied is determined in Step S1004 based on the transmission policy prepared in advance. Alternatively, it is possible to use a transmission policy set by a user. To that end, a UI for setting the transmission policy is provided in the operation unit 209 of the print control apparatus 101 or in the operation unit 302 of the image forming apparatus 107. A UI screen for setting network levels is shown in FIG. 12, as an example of a transmission policy setting screen.

Figure 12:
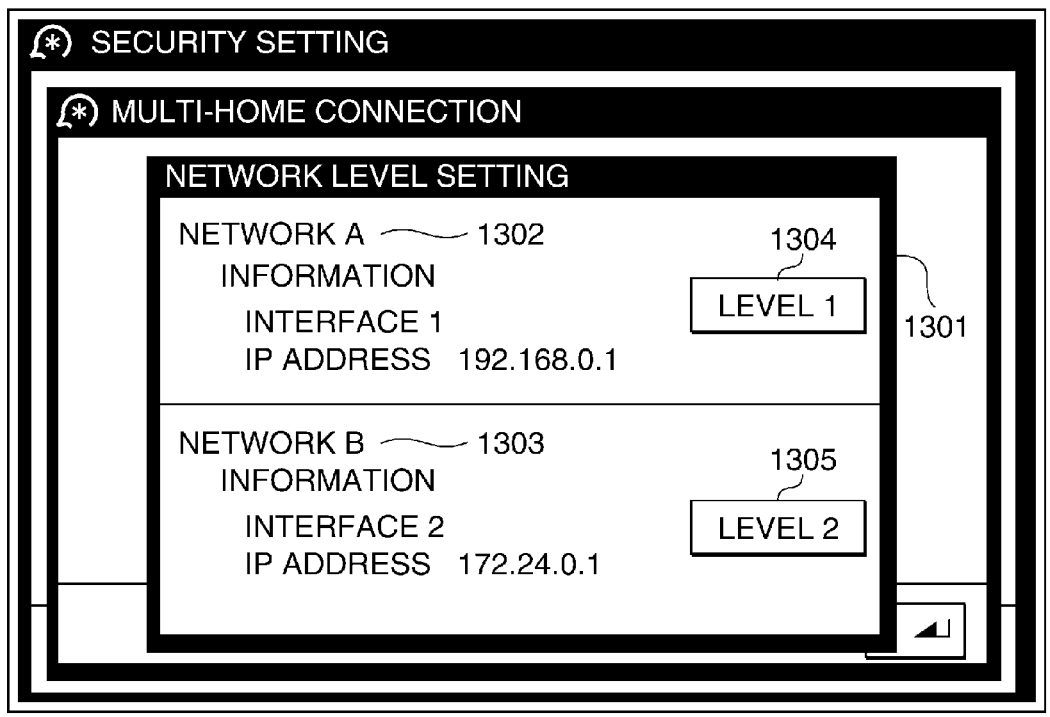
FIG. 12 is a view showing an example of a user interface screen for setting network levels.

Referring to FIG. 12, network information fields 1302, 1303 for indicating networks usable by the apparatus and buttons 1304, 1305 for setting network levels are provided on a screen 1301. In each of the network information fields 1302, 1303, interface information and IP address information are displayed as network information. It should be noted that information such as MAC address information for identifying a network can be displayed.

The buttons 1304, 1305 are each used for setting the level of the corresponding network. Each time either of the buttons is depressed, a corresponding network level value is incremented one by one, so that the level of the corresponding network is decreased from the highest level. In a case that the apparatus connected to two networks (e.g., networks A and B), two sets of network information alone are displayed on the screen 1301 and there are only two possible network levels (i.e., level 1 and level 2). If both the two sets of network information are set to level 1, the transmission policy shown in FIG. 11A is applied. If one of the two sets of network information is set to level 1 and the other network information is set to level 2, the transmission policy shown in FIG. 11B is applied. When the network level setting has been accepted, the setting content is reflected to the transmission condition to be used in Step S1004 in FIG. 10.

In this embodiment, the network level setting has bee described for the communication apparatus connected to the two networks 112, 117. Also for a communication apparatus connected to three or more networks, the network level for each of the networks can similarly be set on the screen.

According to the above-described first embodiment, when data is received, a network from which the data has been transmitted is identified, and information representing the identified network (i.e., network information), e.g., an attribute value, is added to the received data (e.g., attribute information of the received data). Then, the data and the network information are stored in the management table so as to correspond to each other. To transmit the stored data to a network, the propriety of data transmission is determined based the network information corresponding to the data, whereby the security at the time of retransmission of the stored data to a network can be maintained and improved and a system having high security can be provided, even in a network environment where multi-home connection can be made.

(Second Embodiment)

A communication apparatus according to a second embodiment of this invention is basically the same in construction as the communication apparatus of the first embodiment. Like parts which are the same or similar to those of the first embodiment are denoted by like numerals, and a description thereof is omitted. In the following, a description will be given of only points different from the first embodiment.

In the second embodiment, a printing system will be described in which a restriction is selectively applied to data transfer by including shared information "Share" and secret information "Secure" into the network information described in the first embodiment. The following process is executed by CPUs (not shown) of the terminal apparatuses 111, 115, the CPU 207 of the print control apparatus 101, and the control unit 308 of the image forming apparatus 107 (hereinafter, simply referred to as the terminal apparatuses 111, 115, the print control apparatus 101, and the image forming apparatus 107). A process for transmitting and receiving a job or the like is executed by the print control apparatus 101 and the image forming apparatus 107 in cooperation with the structural elements previously described with reference to FIGS. 2 and 3.

First, with reference to FIGS. 13 to 16, a description will be given of a series of operation processes where the print control apparatus 101 receives a job generated by the terminal apparatus 111 and transfers the received job to the image forming apparatus 107, and the image forming apparatus 107 stores the received job into the HDD 309. The following description is also applicable to a case where a job is generated by the terminal apparatus 115 and a description of such a case will be omitted.

Figure 13:
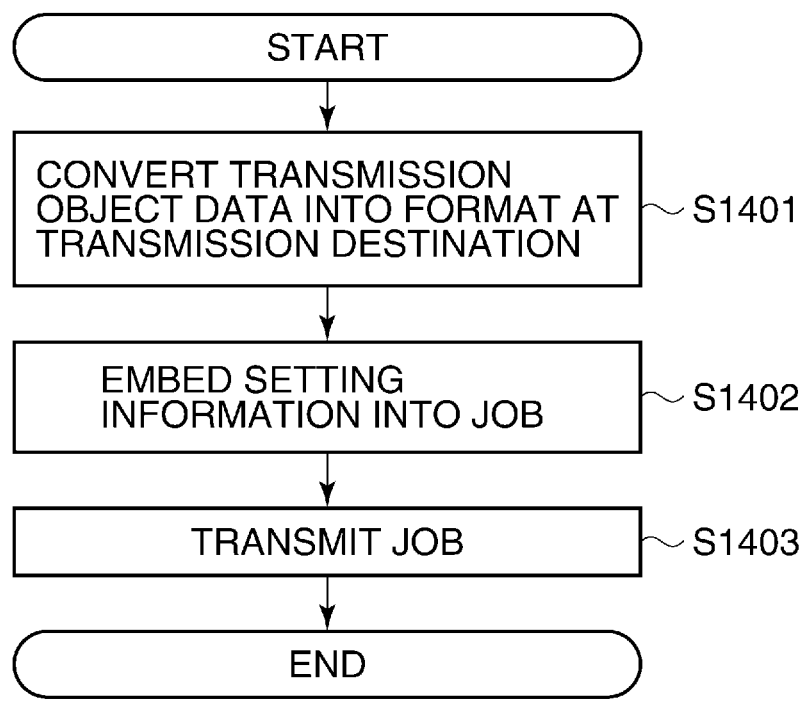
FIG. 13 is a flowchart showing an example of an operation process performed by a terminal apparatus in a second embodiment of this invention to transmit a job.

FIG. 13 shows in flowchart an example operation process performed by the terminal apparatus 111 to transmit a job.

When receiving a user's job transmission instruction, the terminal apparatus 111 converts, as needed, transmission object data (e.g., a document) into a format that can be processed by a transmission destination apparatus, i.e., the print control apparatus 101 or the image forming apparatus 107 (step S1401). In a case, for example, that the transmission object data is a document and a print instruction is given by the user, the document is converted into a print format. If the format conversion is unnecessary, Step S1401 is skipped.

In Step S1402, the terminal apparatus 111 acquires shared setting-related (or security setting-related) information from a user's print setting accepted by an operation unit (not shown), and embeds the acquired setting information into the job. To perform a shared setting, predetermined information is embedded into, e.g., data to be sharedly used by users such as print form data or watermark, or data to be made usable by a user on another network so that the data can be transmitted to networks. To perform a security setting, predetermined information is embedded into data whose security is to be maintained, among data stored in the HDD 309 of the image forming apparatus 107, so that the data cannot be transmitted to networks. An example of a UI screen for accepting a user's shared setting on a job to be transmitted from the terminal apparatus 111 is shown in FIG. 14. A similar screen is displayed also in a case where a job is transmitted from the terminal apparatus 115.

In FIG. 14, reference numeral 1701 denotes an example UI screen displayed for a document print setting. On the screen 1701, there are disposed overlay setting buttons, and a character string "Allow to share" 1702 and radio buttons 1703, 1704 for determining whether or not a form data to be registered should be set to be shared.

If the radio button 1703 is selected, network information "Share", for example, is embedded into the job, whereby the setting becomes such that the form data concerned is made usable on all the networks. On the other hand, if the radio button 1704 is selected, the network information "Share" is not embedded in the job, whereby the setting becomes such that the form data becomes usable only on the same network.

If the radio button 1703 is selected, the content of the user's setting on the screen 1701 is acquired as the network information in Step S1402 in FIG. 13, and information "Network (Share)" 1501 is embedded into the job as shown in FIG. 15. On the other hand, if the radio button 1704 is selected, network information is not embedded into the job. A description is given of PostScript data format in this embodiment, but this is not limitative and other format can be used. It is also possible to embed information that makes the data usable on the same network, when the radio button 1704 is selected.

When the network information has been embedded into the job in Step S1402 in FIG. 14, the flow proceeds to Step S1403 where the job is transmitted to the print control apparatus 101.

Next, with reference to FIG. 20, a description will be given of a UT screen for accepting a user's security setting on a job to be transmitted from the terminal apparatus 111.

Figure 20:
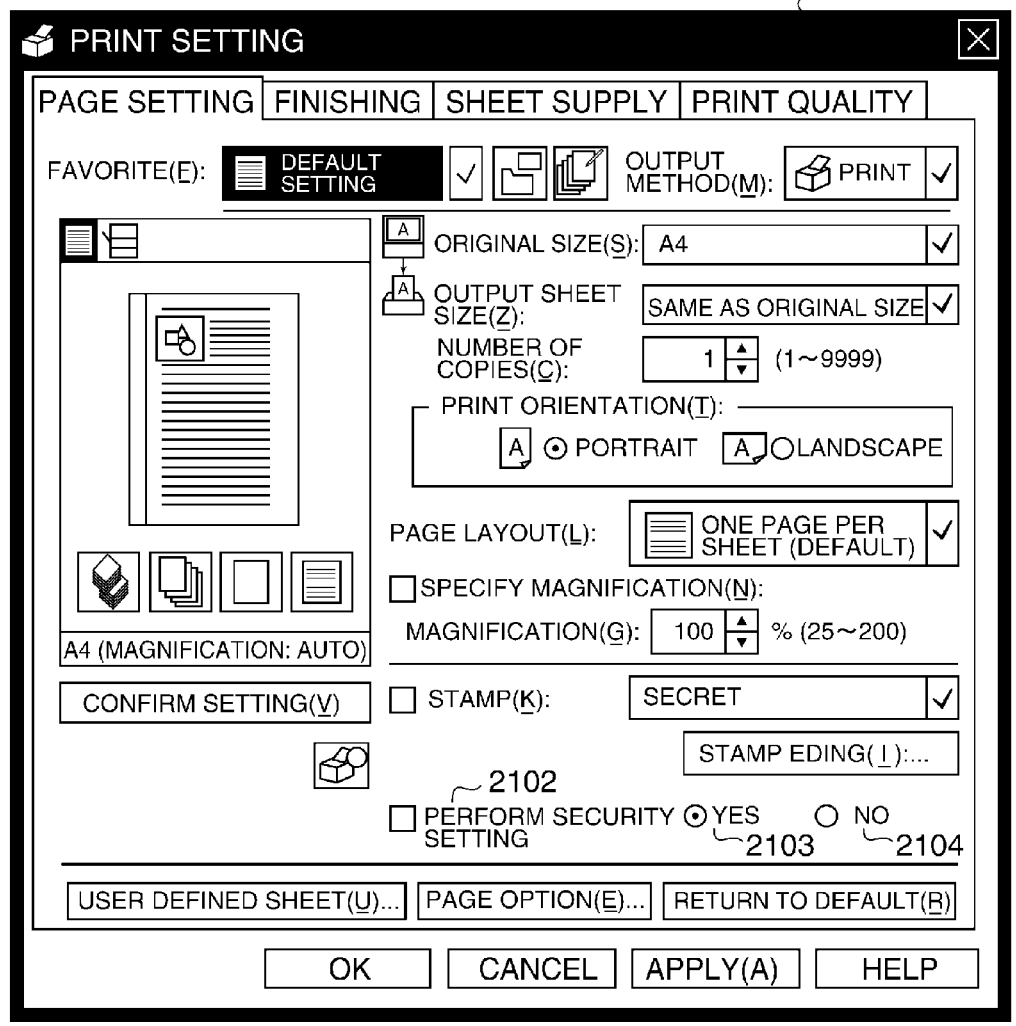
FIG. 20 is a view showing an example of a UI screen that accepts a user's security setting on a job to be transmitted from the terminal apparatus.

In FIG. 20, reference numeral 2101 denotes an example UT screen (a network information setting unit) displayed on an operation unit (not shown) of the terminal apparatus 111 by a printer driver. On the screen 2101, there are disposed print setting buttons, and a character string "Perform security setting" 2101 and radio buttons 2103, 2104 for determining whether or not the security setting should be made on a form data to be registered.

If the radio button 2104 is selected, network information "Secure", for example, is not embedded into the job, whereby the setting is such that the form data concerned is made usable on the same network. On the other hand, if the radio button 2103 is selected, the network information "Secure" is embedded into the job, so that the job in the HDD 309 of the image forming apparatus 107 cannot be transmitted to the network.

For the security setting, the same processing as in the shared setting is performed, but the network information has a value different from that used in the shared setting. The network information "Secure" is used in the security setting of this embodiment. If there are three or more networks, the network information "Secure" can be set on a per network basis.

Next, with reference to FIG. 16, a description will be given of a process performed when the print control apparatus 101 receives a job transmitted from the terminal apparatus 111.

Figure 16:
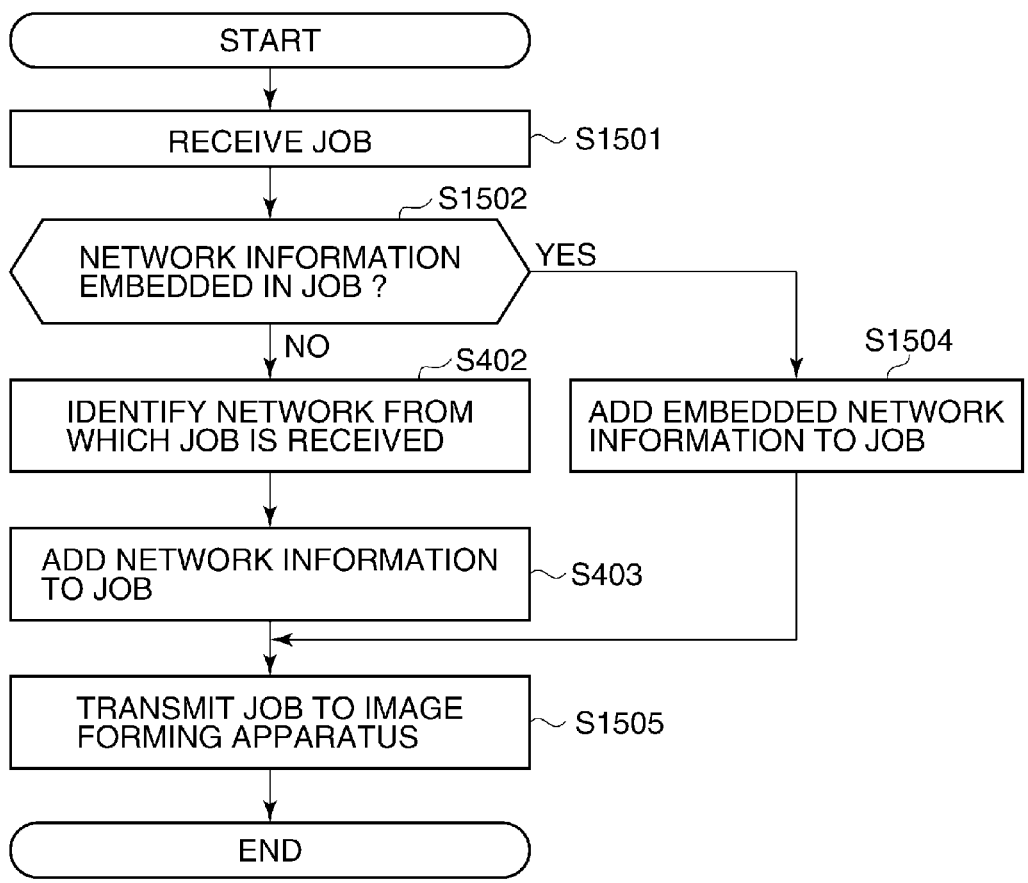
FIG. 16 is a flowchart showing an example process performed by the print control apparatus that receives a job from the terminal apparatus.

FIG. 16 shows in flowchart an example of a process performed by the print control apparatus 101 that receives a job from the terminal apparatus 111.

The print control apparatus 101 receives a job from the terminal apparatus 111 (step S1501), and determines whether network information is embedded in the received data (step S1502). Step S1502 is an example of a network information judgment unit. If it is determined in step S1502 that network information is not embedded in the job, the print control apparatus 101 performs steps S402 and S403, which are the same as steps S402 and S403 in FIG. 4 and therefore a description thereof is omitted.

On the other hand, if it is determined in Step S1502 that network information is embedded, the flow proceeds to Step S1504. In Step S1504, the print control apparatus 101 adds the network information (e.g., a PDL code) embedded by the terminal apparatus 111 to the job (e.g., attribute information of the job). Step S1504 is an example of a network information addition unit. Next, in Step S1505, the print control apparatus 101 transmits the job added with the network information to the image forming apparatus 107.

FIG. 17 shows an example of job attribute information added with network information.

In FIG. 17, reference numeral 1901 denotes attribute information (sheet size, surface designation, etc.) of the job transmitted from the print control apparatus 101.

Reference numeral 1902 denotes network information added to the job by, e.g., the terminal apparatus 111. In the illustrated example, the network information "Network=Share" 1902 added to the job attribute information includes an attribute value "Share" representing that data can be sharedly used on all the networks.

Figure 18:
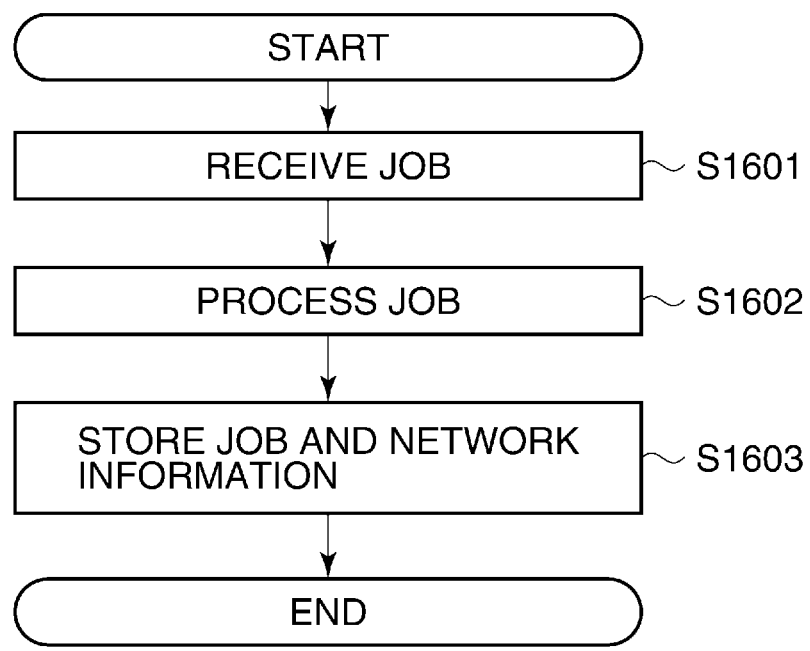
FIG. 18 is a flowchart showing an example process performed by the image forming apparatus that receives a job from the print control apparatus.

FIG. 18 shows in flowchart an example process performed by the image forming apparatus 107 that receives a job from the print control apparatus 101.

Referring to FIG. 18, the image forming apparatus 107 receives a job from the print control apparatus 101 (step S1601), and processes (e.g., prints) the received job (step S1602).

In Step S1603, the image forming apparatus 107 acquires network information from the job, which has been added to the job by the terminal apparatus 111 or the print control apparatus 101, and stores the job and the network information into a management table 1900 (FIG. 19) in the HDD 309.

Figure 19:
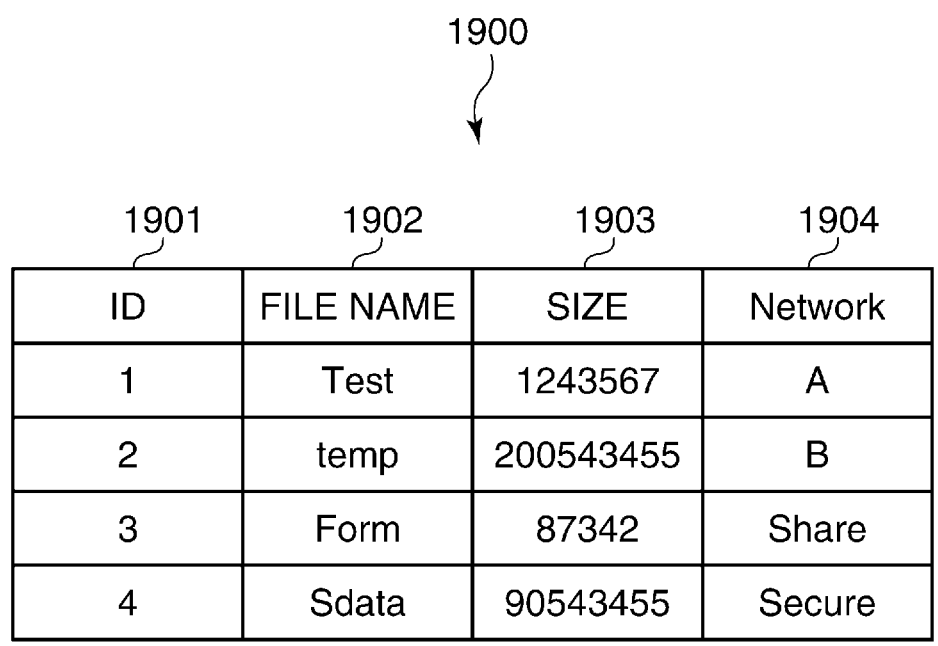
FIG. 19 is a view showing a management table stored in an HDD of the image forming apparatus.

As shown in FIG. 19, the management table 1900 includes an ID storage field 1901, a file name storage field 1902, a file size storage field 1903, and a network information storage field 1904. Pieces of network information acquired from respective ones of jobs are stored in the network information storage field 1904.

In the illustrated example, the network information storage field 1904 stores an attribute value A representing the network 112, an attribute value B representing the network 117, an attribute value "Share" representing that data can be sharedly used on all the networks, and an attribute value "Secure" representing that data should be kept secret, e.g., representing that data has been encrypted.

In this embodiment, data that can be sharedly used on all the networks is represented by the attribute value "Share." Alternatively, such data can be represented by listing all the attribute values corresponding to all the networks (attribute values A, B in the illustrated example) in a corresponding line of the network information storage field 1904. If there are three or more networks, an attribute value representing shared use may be set on a per network basis.

In the second embodiment, the operation process shown in FIGS. 9 and 10 is performed as in the first embodiment when the image forming apparatus 107 transmits data stored in the HDD 309 to the terminal apparatus 111 or 115. Only different points from the first embodiment will be described below.

In the second embodiment, the transmission condition (transmission policy) utilized in Step S1004 in FIG. 10 is set as shown in FIG. 21A or 21B.

FIG. 21A shows an example transmission policy table utilized to transmit received data to the same network, and FIG. 21B shows an example transmission policy utilized in a case where there is a superordinate/subordinate concept between networks.

The transmission policy table shown in FIG. 21A is utilized, for example, when the image forming apparatus 107 stores a job received from the terminal apparatus 111 on the network 112 and transmits the job not to the network 117 but to the network 112. With this transmission policy, a job can be transmitted only to a network of the same level as a transmission source network from which the job has been received, and cannot be transmitted to other networks.

As shown in FIG. 21A, the transmission policy table includes a network information field 2201, a transmission destination network information field 2202, and a policy field 2203. Reference numerals 2204 to 2211 in FIG. 21A denote the first to eighth lines of the transmission policy table, respectively. In the fields 2201 to 2203 of each line, there are stored network information (an attribute value A or B representing a network A or B, an attribute value "Share" representing a shared setting, or an attribute value "Secure" representing a security setting in the illustrated example), information that represents a data transmission destination candidate network (the attribute value A or B in the illustrated example), and information that represents whether data can be transmitted to the candidate network (a value of OK or NG in the illustrated example), respectively.

Values A, A, and OK indicating that data received via the network A can be transmitted (transferred) to the same network A are stored in the fields 2201 to 2203 of the first line 2204.

Values A, B, and NG indicating that data received via the network A cannot be transmitted (transferred) to the different network B are stored in the fields 2201 to 2203 of the second line 2205. The third line 2206 indicates that data received via the network B cannot be transmitted (transferred) to the network A. The fourth line 2207 indicates that data received via the network B can be transmitted (transferred) to the network B.

Each of the fifth and sixth lines 2208, 2209 is stored in its field 2201 with the attribute value "Share" representing the shared setting, and indicates that data can be transmitted to any of the networks.

Each of the seventh and eighth lines 2210, 2211 is stared in its field 2201 with the attribute value "Secure" representing the security setting, and indicates that data cannot be transmitted to any of the networks.

The transmission policy table shown in FIG. 21B is applied in a case where there is a superordinate/subordinate concept between networks. This transmission policy indicates that data can be transmitted from a superordinate network (the network A in the illustrated example) to a subordinate network (the network B in the illustrated example), but cannot be transmitted from the subordinate network to the superordinate network.

As shown in FIG. 21B, the transmission policy table includes a network information filed 2201, a transmission destination network information field 2202, and a policy field 2203. Reference numerals 2301 to 2308 in FIG. 21B denote the first to eighth lines of the transmission policy table, respectively. In the fields 2201 to 2203 of each line, there are stored network information (an attribute value A or B representing a network A or B, an attribute value "Share" representing a shared setting, or an attribute value "Secure" representing a security setting in the illustrated example), information that represents a data transmission destination candidate network (the attribute value A or B in the illustrated example), and information that represents whether data can be transmitted to the candidate network (a value of OK or NG in the illustrated example), respectively.

Values A, A, and OK indicating that data received via the network A can be transmitted (transferred) to the same network A are stored in the fields 2201 to 2203 of the first line 2301.

Values A, B, and OK indicating that data received via the superordinate network A can be transmitted (transferred) to the subordinate network B are stored in the fields 2201 to 2203 of the second line 2302.

Values B, A, and NG indicating that data received via the subordinate network B cannot be transmitted (transferred) to the superordinate network A are stored in the fields 2201 to 2203 of the third line 2303. The fourth line 2304 indicates that data received via the network B can be transmitted (transferred) to the network B of the same level.

Each of the fifth and sixth lines 2305, 2306 is stored in its field 2201 with the attribute value "Share" representing the shared setting, and indicates that data can be transmitted to any of the networks. Each of the seventh and eighth lines 2307, 2308 is stored in its field 2201 with the attribute value "Secure" representing the security setting, and indicates that data cannot be transmitted to any of the networks.

Although the transmission conditions (transmission policies) associated with the two networks A, B have been described, the transmission conditions are not limitative thereto and other policies can be defined.

As for the transmission policy setting, as with the first embodiment, it is possible to display the network level setting screen 1301 shown in FIG. 12 on the operation unit 209 of the print control apparatus 101 or on the operation unit 302 of the image forming apparatus 107.

If the attribute value "Secure" is set to prohibit data from being read from the HOD 309 of the image forming apparatus 107 and from being transmitted, it is possible to make an error exit without transmitting the data to the print control apparatus 101.

With the second embodiment, according to pieces of network information stored and managed together with data in the HDD of the image forming apparatus 107, shareable data is allowed to be transmitted to networks and unshareable data is prevented from being transmitted to networks, whereby confidentiality in data transmission to networks can be improved.

Although arrangements having two network I/Fs each comprised of a NIC unit have been described in the first and second embodiments, network-connectable I/Fs of any system and any form can be used and three or more network I/Fs can be used.

In the first and second embodiments, arrangements in which the image forming apparatus 107 and the print control apparatus 101 are configured separately from each other have been described. However, the image forming apparatus 107 and the print control apparatus 101 can be configured integrally with each other. In the above, this invention is applied to the print control apparatus, but is also applicable to other communication apparatuses.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-271907, filed Nov. 30, 2009, which is hereby incorporated by reference herein in its entirety.

What is claimed is:

1. A method of communicating with a communication apparatus having a storage device and a plurality of network interfaces, the method comprising a reception step of receiving data to be transmitted from an external apparatus via any of the plurality of network interfaces, a first storage step of storing in the storage device, when the reception step receives the data, first network information that represents a network interface, among the plurality of network interfaces, used when the reception step receives the data, and the data received in the reception step in association with the first network information, a data transmission step of transmitting, via any of the plurality of network interfaces, the data stored in the first storage step, and a determining step of determining whether or not the data transmission step should transmit the data stored in the first storage step, based on the first network information associated with data to be transmitted and second network information that represents a network interface to be used when the data transmission step transmits the data stored in the first storage step a second storage step of storing, for each combination of the network interface used when the data is received and the network interface used when the data is transmitted, policy information for determining whether or not to transmit the data, wherein the determining step determines, based on the first network information, the second network information, and the policy information, whether or not the data transmission task transmits the data stored in the first storage step, a second storage step of storing, for each combination of the network interface used when the data is received and the network interface used when the data is transmitted, policy information for determining whether or not to transmit the data, wherein the determining step determines, based on the first network information, the second network information, and the policy information, whether or not the data transmission task transmits the data stored in the first storage step.

2. The method according to claim 1, wherein the first storage step also stores the second network information when the data transmission step transmits the data.

3. The method according to claim 1, wherein the data transmission task transmits data designated by the user from among the data stored in the first storage step.

4. The method according to claim 1, wherein the policy information stored in the second storage step is set by the user.

5. A non-transitory computer-readable storage medium storing a program executable by a computer to execute a method of communicating with a communication apparatus having a storage device and a plurality of network interfaces, the method comprising: a reception step of receiving data to be transmitted from an external apparatus via any of the plurality of network interfaces; a first storage step of storing in the storage device, when the reception step receives the data, first network information that represents a network interface, among the plurality of network interfaces, used when the reception step receives the data, and the data received in the reception step in association with the first network information;
a data transmission step of transmitting, via any of the plurality of network interfaces, the data stored in the first storage step; and a determining step of determining whether or not the data transmission step should transmit the data stored in the first storage step, based on the first network information associated with data to be transmitted and second network information that represents a network interface to be used when the data transmission step transmits the data stored in the first storage step,
a second storage step of storing, for each combination of the network interface used when the data is received and the network interface used when the data is transmitted, policy information for determining whether or not to transmit the data, wherein the determining step determines, based on the first network information, the second network information, and the policy information, whether or not the data transmission task transmits the data stored in the first storage step.

6. The non-transitory computer-readable storage medium according to claim 5, wherein the policy information stored in the second storage step is set by the user.

7. The non-transitory computer-readable storage medium according to claim 5, wherein the first storage step also stores the second network information when the data transmission step transmits the data.

8. The non-transitory computer-readable storage medium according to claim 5, wherein the data transmission task transmits data designated by the user from among the data stored in the first storage step.

9. A communication apparatus having a plurality of network interfaces, the communication apparatus comprising: a storage device; a microprocessor programmed to execute: a reception task that receives data to be transmitted from an external apparatus via any of the plurality of network interfaces; a first storage task that stores in the storage device, when the reception task receives the data, first network information that represents a network interface, among the plurality of network interfaces, used when the reception task receives the data, and the data received by the reception task in association with the first network information; a data transmission task that transmits, via any of the plurality of the network interfaces, the data stored by the first storage task; and a determining task that determines whether or not the data transmission task should transmit the data stored by the first storage task, based on the first network information associated with data to be transmitted and a second network information that represents a network interface to be used when the data transmission task transmits the data stored by the first storage task,
a second storage task that stores, for each combination of the network interface used when the data is received and the network interface used when the data is transmitted, policy information for determining whether or not to transmit the data, wherein the determining task determines, based on the first network information, the second network information, and the policy information, whether or not the data transmission task transmits the data stored by the first storage task.

10. The communication apparatus according to claim 9, wherein the data transmission task transmits the data when the determining task determines that the data transmission task transmits the data, and discards the data when the determining task determines that the data transmission task did not transmit the data.

11. The communication apparatus according to claim 9, wherein the policy information stored by the second storage task is set by the user.

12. The communication apparatus according to claim 9, wherein the first storage task also stores the second network information when the data transmission task transmits the data.

13. The communication apparatus according to claim 9, wherein the data transmission task transmits data designated by the user from among the data stored by the first storage task.

* * * * *